United States Patent [19]

Shanabarger

[11] 4,453,281
[45] Jun. 12, 1984

[54] BEE HIVE FRAME SPACER

[76] Inventor: Francis X. Shanabarger, 4227 E. 250 North, Kokomo, Ind. 46901

[21] Appl. No.: 414,707

[22] Filed: Sep. 3, 1982

[51] Int. Cl.³ .............................................. A01K 47/02
[52] U.S. Cl. ............................................. 6/2 A; 6/10
[58] Field of Search ...................... 6/2 R, 2 A, 10, 11

[56] References Cited

U.S. PATENT DOCUMENTS

| | | | |
|---|---|---|---|
| 1,472,795 | 11/1923 | Frater | 6/10 |
| 1,650,170 | 11/1927 | Weaver | 6/2 A |
| 4,216,557 | 8/1980 | Golde | 6/10 |

FOREIGN PATENT DOCUMENTS

| | | | |
|---|---|---|---|
| 257646 | 4/1949 | Switzerland | 6/10 |
| 172824 | 12/1921 | United Kingdom | 6/2 R |

Primary Examiner—Robert P. Swiatek
Attorney, Agent, or Firm—John H. Calhoun, Jr.

[57] ABSTRACT

A bee hive frame spacer comprising a spacer body having an opening lengthwise therethrough and having double side walls wherein ribbed interior side walls that engage the sides of frame extensions are adapted to compensate for variations in frame extension widths and wherein exterior side walls provide uniform frame-to-frame spacing within a bee hive body and absorb any extra space between frame extensions to prevent the accumulation of propolis. Mounting brackets are provided for attaching the spacer to frames with broken extensions. An extractor tab is provided on the top of the spacer to facilitate prying the frame out of a bee hive with a standard hive tool, and extractor lugs are provided to facilitate removal of frames with a special extractor tool.

3 Claims, 5 Drawing Figures

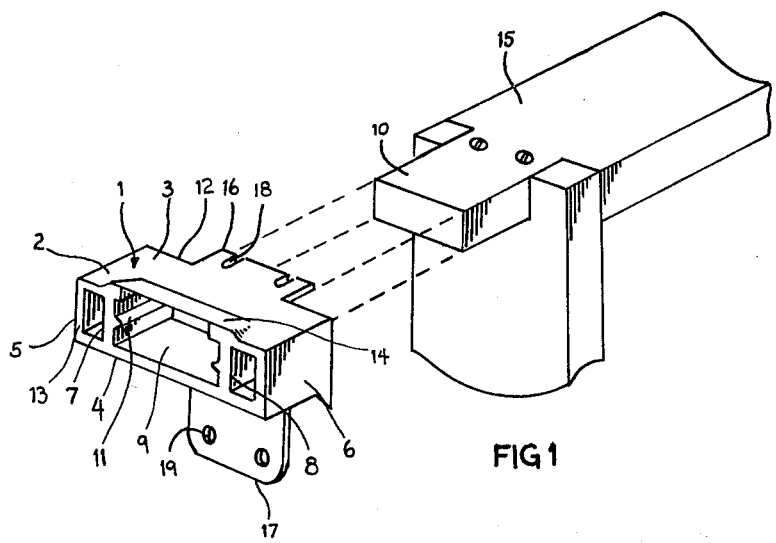
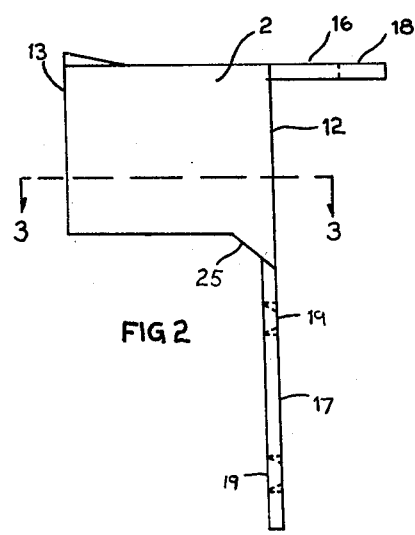
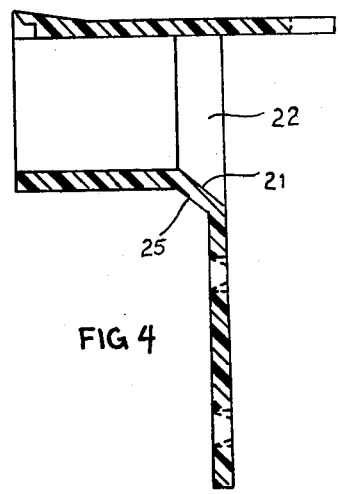
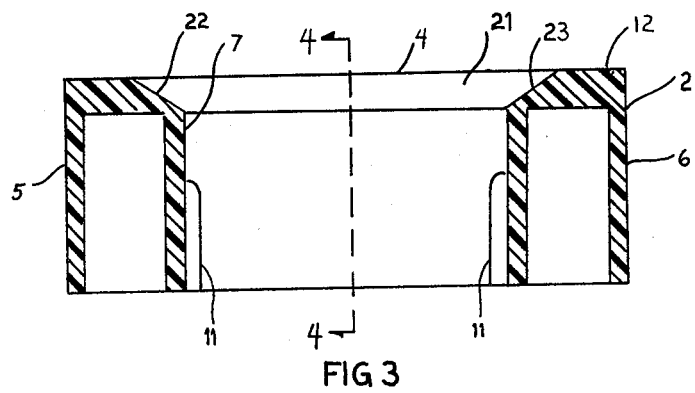

BEE HIVE FRAME SPACER

BACKGROUND OF THE INVENTION

It is a common practice in bee keeping to employ bee hives containing nine or ten removable sections comonly referred to as frames, which frames may contain honeycomb starter sheets intended to facilitate the development of honeycombs. Typically, removable frames are rectangular in shape and are provided at the top with an extension projecting from each end. Frames are positioned within a bee hive by resting the frame extensions on ledges provided at the ends of a hive body.

Uniform frame spacing is an essential requirement for efficient operation of a bee hive. Unequal spacing may result from failure to properly position frame extensions on the ledges or from movement of frames within a hive body. Deposits of a resinous substance known as propolis often accumulate on frame extensions, and adjoining frames may be firmly bound together and frames may be bound to the hive body by excess accumulations of the glue-like material, thereby making it difficult to remove frames without damaging them or contaminating the honey. Breakage of frame extensions is a problem commonly experienced by bee keepers.

Attempts have been made in the past to obtain uniform frame spacing and to minimize the accumulation of propolis. U.S. Pat. No. 1,929,648 issued on Oct. 10, 1933 to Charles Errett Phillips shows a frame spacer for bee hives comprising a bar provided with a plurality of projecting teeth adapted to operate between the frames of a hive and to hold the frames in a spaced relationship and to prevent bees from depositing propolis on frame extensions. U.S. Pat. No. 2,274,090 issued on Feb. 24, 1942 to Eric C. H. Olson shows a metal angle strip placed over rabbets formed in the ledges of the end walls of bee hives to reduce propolization of frames to supports by reducing the area of contact. U.S. Pat. No. 2,446,346 issued on Aug. 3, 1948 to Irvin A. Stoller and U.S. Pat. No. 2,580,282 issued on Dec. 25, 1951 to O. A. Colley show metal frame supports and spacers intended to provide uniform frame spacing. U.S. Pat. No. 3,820,177 issued on June 28, 1974 to Kenneth F. Croan shows a self-gripping spacer strip for use in holding artificial honeycombs properly spaced from one another in a bee hive.

SUMMARY OF THE INVENTION

The spacer of the present invention has all the advantages of spacers known in the art, and in addition provides several distinct and important advantages not provided by existing spacers. One object of the present invention is to provide a spacer that will provide uniform frame-to-frame spacing. Another object of the present invention is to provide a spacer that will absorb any extra space between frame extensions thereby minimizing the opportunity for accumulation of propolis. Another object of the present invention is to provide a spacer that can compensate for usual variations in frame extension widths. Another object of the present invention is to provide a spacer that can be employed with a frame having a broken extension. Another object of the present invention is to provide a spacer that can be easily mounted on a frame extension. Another object of the present invention is to provide a spacer that is adapted to be removed from a bee hive with a standard hive tool. Another object of the present invention is to provide a spacer that is adapted to facilitate vertical removal of a frame from a bee hive with a minimum of risk of damage to or contamination of honeycombs. Another object of the invention is to provide an extractor tool adapted to facilitate the vertical removal of frames. Another object of the present invention is to provide a spacer that is simple in construction, inexpensive, strong and durable, reliable, and well adapted for the purposes for which it is designed. Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

The objectives of the present invention are accomplished by providing a spacer of novel construction comprising a body having double side walls wherein the interior side walls are ribbed and are adapted to flexibly engage the sides of frame extensions and to compensate for variations in frame extension widths and the exterior side walls are adapted to provide uniform frame-to-frame spacing within a bee hive and to absorb any extra space between frame extensions to present accumulation of propolis.

The interior side walls and bottom of the spacer are beveled at the rear to facilitate placing a spacer on a frame extension. Two mounting brackets are provided, including a horizontal bracket at the top and rear of the spacer and a vertical bracket at the bottom and rear of the spacer to permit a spacer to be attached to the top and side of a frame having a broken extension. An extractor tab is provided across the top of the spacer to allow the spacer to be pried loose from another spacer or from a hive body using a standard hive tool. Extractor lugs on each side at the bottom and rear of the spacer are adapted to be engaged by a novel extractor tool. The extractor tool comprises a resilient strap having a latch assembly at each end. The extractor tool is placed over and lengthwise of a frame to be removed, and the latches at the two ends of the tool engage the extractor lugs on spacers at each end of the frame so that pulling upward on the center of the strap will cause the frame to rise vertically out of a hive body.

BRIEF DESCRIPTION OF THE DRAWINGS

A preferred embodiment of the present invention is illustrated in the accompanying drawings in which:

FIG. 1 is a view in perspective of a spacer of the present invention;

FIG. 2 is a side elevation view of the spacer;

FIG. 3 is a cross sectional view taken along line 3—3 of FIG. 2;

FIG. 4 is a cross sectional view taken along line 4—4 of FIG. 3; and

DESCRIPTION OF THE PREFERRED EMBODIMENT

Figure 5:
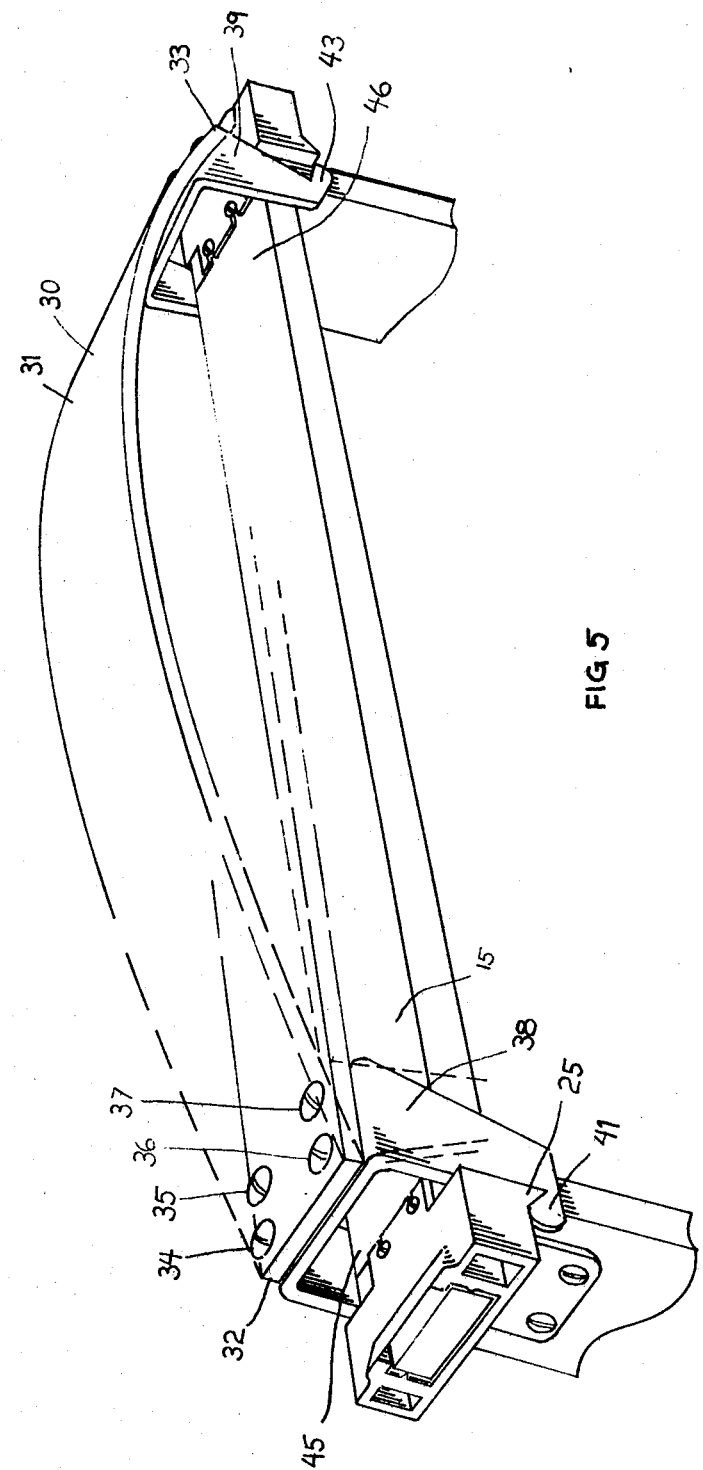
FIG. 5 is a view in perspective of an extractor tool.

Referring now to the drawings in greater detail, FIG. 1 illustrates a frame spacer of the present invention shown generally at 1. The spacer 1 comprises a body 2 having a top 3, a bottom 4, two exterior side walls 5, 6, and two interior side walls 7, 8. The top 3, bottom 4 and two interior side walls 7, 8 form an opening 9 through the body 2 which opening 9 is adapted to receive a frame extension 10 inserted therein. The outside width of the spacer body 2 is determined so that a prescribed number of frames, usually 9 or 10, will exactly fit on frame support ledges of standard style bee hives such, for example, as the Langstroth hive. The opening 9 is of the correct width to receive a standard frame extension 10 like those found in the so called Hoffman self-spacing frame snugly but removably inserted therein.

It is well known that frame projections vary in width from frame to frame. The inside surface of each interior side wall 7, 8 is provided with a longitudinal rib 11 adapted to engage the sides of an undersized frame extension 10. Interior side walls 7, 8 are adapted to flex outward when an oversized frame extension 10 is inserted into a spacer body 2. As can now be seen, the four side walls 5, 6, 7, 8 cooperate with one another to compensate for variations in frame extension widths, while at the same time providing uniform frame-to-frame spacing within a bee hive, and while absorbing any extra space between frame extensions which space might otherwise be filled with deposits of propolis.

The spacer body 2 is provided with a first mounting means comprising a rearward projecting mounting bracket 16 and a second mounting means comprising a downward projecting mounting bracket 17. The two mounting brackets 16, 17 are provided with a plurality of connection means 18, 19 to facilitate attaching a spacer 1 to a frame 15. The connection means shown are slots 18 and holes 19 through the brackets 16, 17 which slots and holes are adapted to receive nails or other suitable fasteners inserted therethrough. Breakage of frame extensions 10 is a problem commonly experienced by bee keepers, and the two mounting brackets 16, 17 allow a spacer 1 to be nailed or otherwise attached to the top and side of a frame 15 when the frame extension 10 is missing.

The bottom 4 and interior side walls 7, 8 are beveled at the rear 12 of the frame body 2 as shown at 21, 22 and 23 in FIGS. 3 and 4 to facilitate inserting a frame extension 10 into a spacer 1.

Bee keepers have long used commercially available hive tools of standard design for prying frames loose from bee hive bodys, scraping wax and propolis off frames, and performing other tasks in and around bee hives. Standard hive tools have a flat end or pry bar similiar in structure to the end of a screwdriver or chisel.

A first extractor means comprising a raised tab 14 is provided on the top 3 of the body 2 near the front 13. Removal of a frame 15 from a bee hive may be faciliated by inserting the pry bar end of a hive tool or other prying instrument under the tab 14 and, using the side of the hive body as a fulcrum, pushing down on the other end of the tool.

Also provided is a second extractor means comprising extractor lugs 25 that extend downward at the rear 12 of the spacer body 2, which lugs are adapted to be engaged by a frame extractor tool 30.

The frame extractor tool 30 illustrated in FIG. 5 comprises a resilient strap 31 made of plastic or other suitable material having attached at each end 32, 33 thereof by bolts 34, 35, 36, 37 or other suitable means latches 38, 39 each having on opposite sides thereof like hooks 41, 43 adapted to engage the extractor lugs 25.

The hooks 40, 41 at one end 32 of the tool 30 are placed under the extractor lugs 25 of a spacer 1 at one end 45 of a frame 15. The strap 31 is then bent upward to place the hooks 42, 43 at the other end 33 of the tool 30 under the lugs 25 of a spacer 1 at the other end 46 of the frame 15. The frame 15 may then be pulled vertically out of a hive body by merely pulling upward on the center of the strap 31.

Having thus described my invention, what I now claim is:

1. A bee hive frame spacer comprising a tubular body having a pair of interior side walls extending lengthwise thereof, a pair of exterior side walls extending lengthwise thereof, a flat top extending from the outside of a first of the said pair of exterior side walls to the outside of a second of the said pair of exterior side walls and extending the length of the said body and fixed to and integral with the top of each of the said exterior side walls and fixed to and integral with the top of each of the said interior side walls and having provided at one end thereof a raised tab and having provided at the other end thereof and extending rearward and lengthwise therefrom a horizontal mounting bracket, a spacer bottom comprising a flat member extending from the outside of a first of the said pair of exterior side walls to the outside of a second of the said pair of exterior side walls and extending rearward from the front of the said body and a lug portion integral with the said flat member and extending angularly downward and rearward from the said flat member, the said spacer bottom being fixed to and integral with the bottom of each of the said exterior side walls and fixed to and integral with the bottom of each of the said interior side walls and having provided at the rear of the said spacer bottom and extending downward therefrom a vertical mounting bracket.

2. A bee hive frame spacer comprising a rectangular tubular body having a pair of like, vertical, opposing, parallel, resilient, interior side walls of equal length extending lengthwise thereof, a pair of like, vertical, opposing, parallel, exterior side walls parallel with and having the same length as the aforesaid pair of interior side walls extending lengthwise thereof, a flat horizontal top extending from the outer vertical lengthwise surface of a first of the said pair of exterior side walls to the outer vertical lengthwise surface of a second of the said pair of exterior side walls and extending the length of the said body and fixed to and integral with the top of each of the said exterior side walls and fixed to and integral with the top of each of the said interior side walls and having provided at one and thereof a raised tab and having provided at the other end thereof and extending rearward and lengthwise therefrom a flat horizontal mounting bracket, a spacer bottom comprising a flat horizontal member extending from the outer vertical lengthwise surface of a first of the said pair of exterior side walls to the outer vertical lengthwise surface of a second of the said pair of exterior side walls and extending rearward from the front of the said body and a lug portion integral with the said flat horizontal member and extending angularly downward and rearward from the said flat horizontal member, the said spacer bottom being fixed to and integral with the bottom of each of the said exterior side walls and fixed to and integral with the bottom of each of the said interior side walls and having provided at the rear of the said spacer bottom and extending downward therefrom a flat vertical mounting bracket.

3. A bee hive frame spacer comprising a rectangular tubular body having a pair of like, vertical, opposing, parallel, resilient, interior side walls of equal length extending lengthwise thereof, a pair of like, vertical, opposing, parallel exterior side walls parallel with and having the same length as the aforesaid pair of interior side walls extending lengthwise thereof, a flat horizontal top extending from the outer vertical lengthwise surface of a first of the said pair of exterior side walls to the outer vertical lengthwise surface of a second of the said pair of exterior side walls and extending the length of the said body and fixed to and integral with the top of each of the said exterior side walls and fixed to and integral with the top of each of the said interior side walls and having provided at one and thereof a raised tab and having provided at the other end thereof and extending rearward and lengthwise therefrom a flat horizontal mounting bracket, a spacer bottom comprising a flat horizontal member extending from the outer vertical lengthwise surface of a first of the said pair of exterior side walls to the outer vertical lengthwise surface of a second of the said pair of exterior side walls and extending rearward from the front of the said body and a lug portion integral with the said flat horizontal member and extending angularly downward and rearward from the said flat horizontal member, the said spacer bottom being fixed to and integral with the bottom of each of the said exterior side walls and fixed to and integral with the bottom of each of the said interior side walls and having provided at the rear of the said spacer bottom and extending downward therefrom a flat vertical mounting bracket, wherein each of the said interior side walls has provided on the inside surface and extending lengthwise thereof a raised horizontal rib and wherein the said inside surfaces of the said interior side walls and the said spacer bottom are beveled at the rears thereof to provide an enlarged entrance at the rear of the spacer to facilitate insertion of a bee hive frame extension into the said spacer, and wherein the said interior side walls and the said flat horizontal top and the said spacer bottom form a rectangular opening through the said spacer body, and wherein the said flat horizontal top is adapted to retain the said tops of the said exterior side walls and the said tops of the said interior side walls in fixed spacial relationships relative to one another and wherein the said spacer bottom is adapted to retain the said bottoms of the said exterior side walls and the said bottoms of the said interior side walls in fixed spacial relationships relative to one another, and wherein the said spacer is adapted to be seated on and be supported by a ledge within a bee hive structure and wherein the said lengthwise opening formed by the said pair of interior side walls and the said top and the said spacer bottom is adapted to receive a frame extension inserted therein, and wherein the said interior side walls of the said spacer are adapted to flexibly engage the sides of a bee hive frame extension inserted therebetween, and wherein the said exterior side walls of the said spacer are adapted to retain a hive frame in fixed spacial relationships with other hive frames within a hive body, and wherein the said horizontal mounting bracket is adapted to attach the said spacer to the top of a hive frame, and wherein the said vertical mounting bracket is adapted to attach the said spacer to a side of a hive frame, and wherein the said raised tab is adapted to be engaged by a prying instrument, and wherein the said lug portion of the said spacer bottom is adapted to be engaged by an extractor tool.

* * * * *